United States Patent [19]

Dix

[11] 4,143,908
[45] Mar. 13, 1979

[54] WINDOWED T-TOP INSTALLATION FOR VANS AND THE LIKE

[76] Inventor: Michael D. Dix, Rte. 2, Box 316, Cedar Hill, Mo. 63016

[21] Appl. No.: 832,403

[22] Filed: Sep. 12, 1977

[51] Int. Cl.² ............................................. B60J 7/04
[52] U.S. Cl. .................................. 296/137 B; 98/2.14
[58] Field of Search ...................... 296/137 R, 137 B; 49/408, 409, 360, 374; 98/2.14; 244/129 W

[56] References Cited

U.S. PATENT DOCUMENTS

| 2,173,890 | 9/1939 | Tuttle | 296/137 B |
| 3,975,049 | 8/1976 | Niessner | 296/137 B |

Primary Examiner—Joseph F. Peters, Jr.
Assistant Examiner—Gene A. Church

Attorney, Agent, or Firm—Jerome A. Gross

[57] ABSTRACT

A simulated T-top installation is provided for automotive vans. Cut-outs for roof windows are made, and a molded fiberglass fairing is superimposed, extending between the opposite rain gutters from the windshield to aft of the doors. Removable window panes are installed on continuous gasket strips on recessed ledges projecting from downward-formed rims of the fairing, inwardly of the cut-outs in the sheet metal roof. Notches cut in the sheet metal at the forward outer corners of the cut-outs accept locally deepened sections of the fairing, each having a drain passage leading outward from the recessed ledge. Water entering about the window pane edges will flow along the ledges between the rims and the window gaskets to these forward outer corners, to drain through the passages.

6 Claims, 9 Drawing Figures

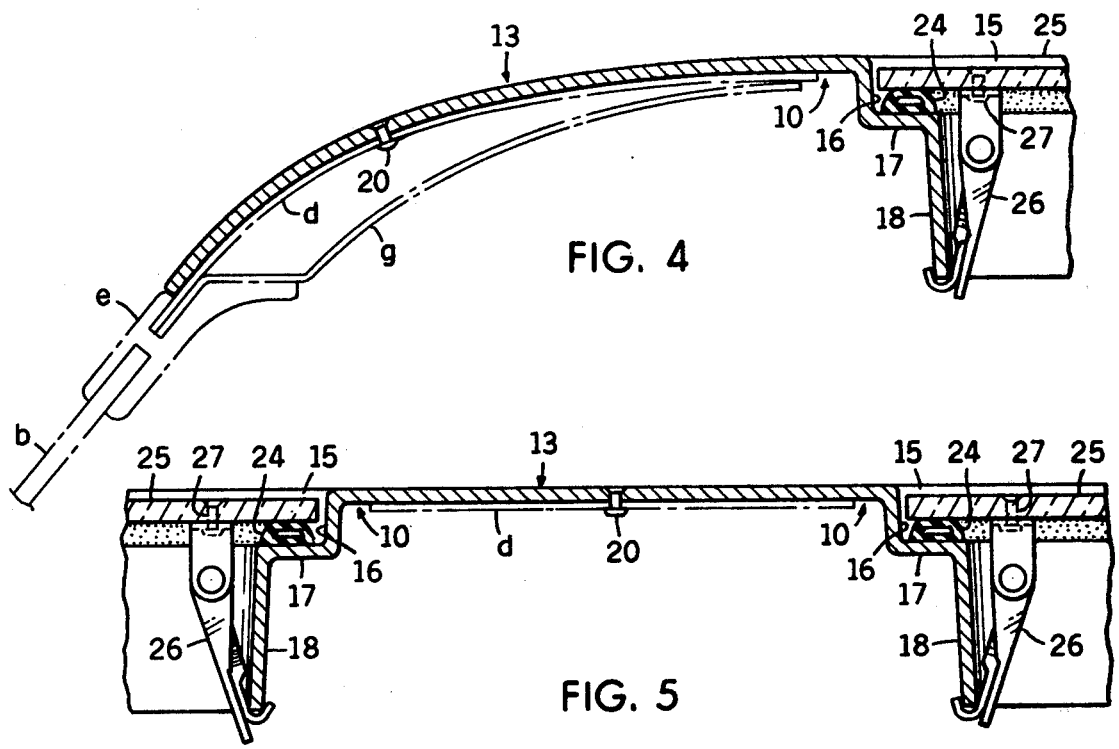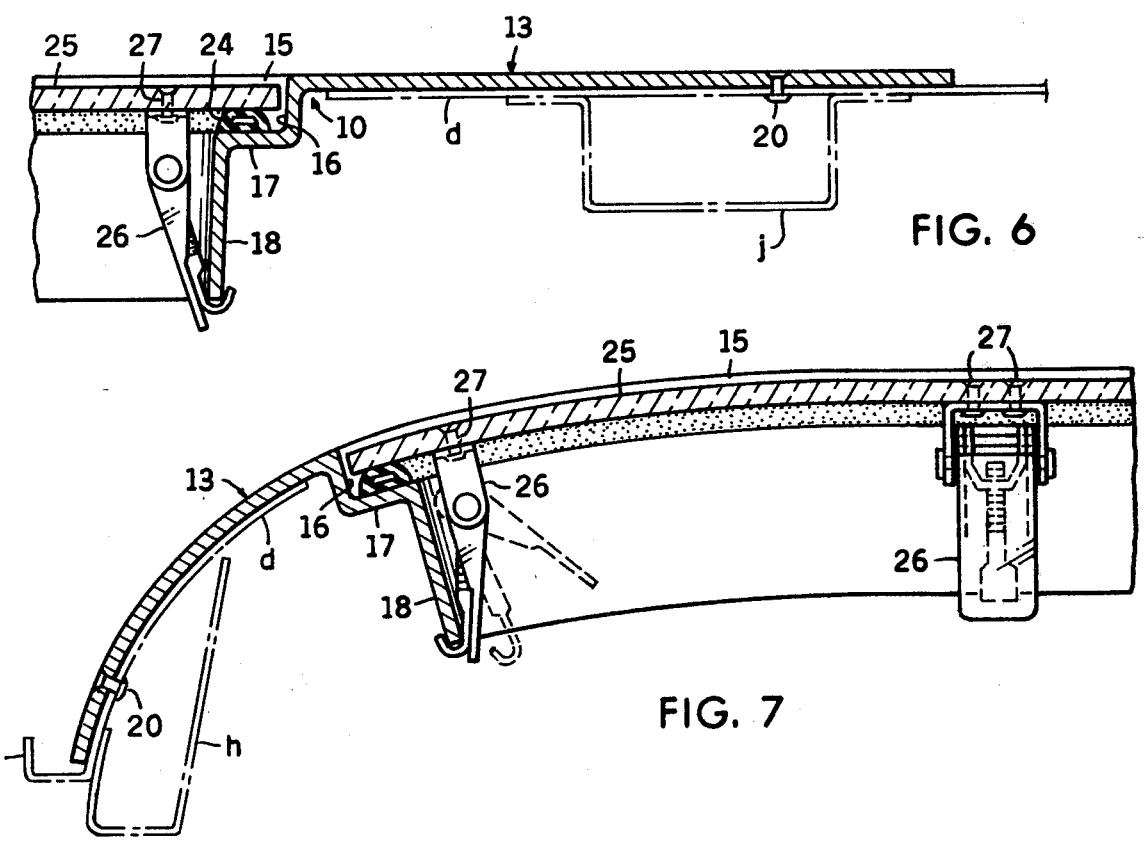

WINDOWED T-TOP INSTALLATION FOR VANS AND THE LIKE

BACKGROUND OF THE INVENTION

Some highly styled passenger cars are equipped with "T" roofs having a single structural member extending along the longitudinal center line from the windshield to a point aft of the doors, with removable windows at both sides of this central member. This styling feature has not heretofore been simulated in vans, which appeal to the same class of style-conscious purchasers of vehicles.

Roofs of vans are conventionally made of sheet metal, slightly crowned above side rain gutters and the upper edge of the windshield. To provide removable windows in such a van roof simulating "T" tops of passenger cars gives rise to the problem of how water, which may gather between the edge of a window and the framed rim in which it is recessed, may be drained. Unless such water can be drained away, the roof window of vans exposed to rain could not be opened or removed without wetting the interior of the van. The present invention overcomes this problem as hereinafter set forth.

SUMMARY OF THE INVENTION

To make a T-top window installation in vans, a pair of substantially rectangular window cut-outs are cut in the sheet metal, on both sides of the longitudinal center line, and extending from near the upper end of the windshield at the front, inward of the rain gutters on the sides, aft about as far as the front doors. Over these window cut-outs a one-piece molded fiberglass fairing may be attached, having a pair of inward rimmed window openings.

Where the windows are to be set flush in the openings against gaskets on support ledges within the rimmed openings, water may collect along the outer edges of the windows. The problem presented is to drain such water, so that the windows may be opened or removed without wetting the interior of the van.

In the present invention, advantage is taken of the fact that, in a van of typical configuration the roof is crowned and the forward outer corner of each roof window is its lowest point; water will drain toward it. Also, for attractive appearance the corners of these windows are formed to a substantial radius, leaving a substantial length of partly crowned metal extending to the structure above the windshield and frame members above the doors.

In the present invention, the window cut-outs have notches extending outward from the forward outer corner of each cut-out to a level below that of the fairing ledge on which the window rests. The fairing, crowned to correspond with the crown of the vehicle roof, is locally thickened in registration with these notches at each of the forward outer corners, so as to be solid to a depth below that of the ledge. A drain passage is formed at each forward outer corner, leading outward from the surface of the window ledge and downward through this solid thickened portion of the fairing. Hence, water which enters between the edge of each window and the surrounding rim of the frame is confined by the continuous gasket on the ledge; because of the contour of the top it drains to the two forward outer corners, and thence drains outward and downward through the passages there formed in the locally thickened fairing, without flowing over the crown of the fairing.

Accordingly, the present invention comprises both the drain-equipped fairing assembly and the method of installing it in the crowned sheet metal roof of vans and other automotive vehicles, as hereafter more fully described.

BRIEF DESCRIPTION OF THE DRAWINGS

FIG. 4 is an enlarged sectional view taken along line 4—4 of FIG. 1.

FIG. 5 is a similar sectional view taken along line 5—5 of FIG. 1.

FIG. 6 is a similar sectional view taken along line 6—6 of FIG. 1.

FIG. 7 is a similar cross-sectional view taken along line 7—7 of FIG. 1.

DESCRIPTION OF THE PREFERRED EMBODIMENT

The illustrated embodiment of the present invention is for use on an automotive van roof. A van, generally designated a, partially shown in plan view in phantom lines in FIG. 1, has a windshield b and doors c. The forward portion of its crowned sheet metal roof d is mounted to and forms a watertight seal with the windshield b by a windshield support member e, most clearly shown on FIG. 4. Above and adjacent to the van doors c, the crowned sheet metal roof d has outwardly formed sheet metal gutters f. Beneath the forward portion of the roof d, formed rearward from the windshield support member e, is a forward reinforcement member g, as shown in FIG. 4. Similarly, side reinforcement members h are provided beneath the sides of the metal roof d as shown in FIG. 7. On the underside of the roof d aft of the doors c is a transverse reinforcement chanel j, shown in phantom lines in FIG. 6.

Figure 1:
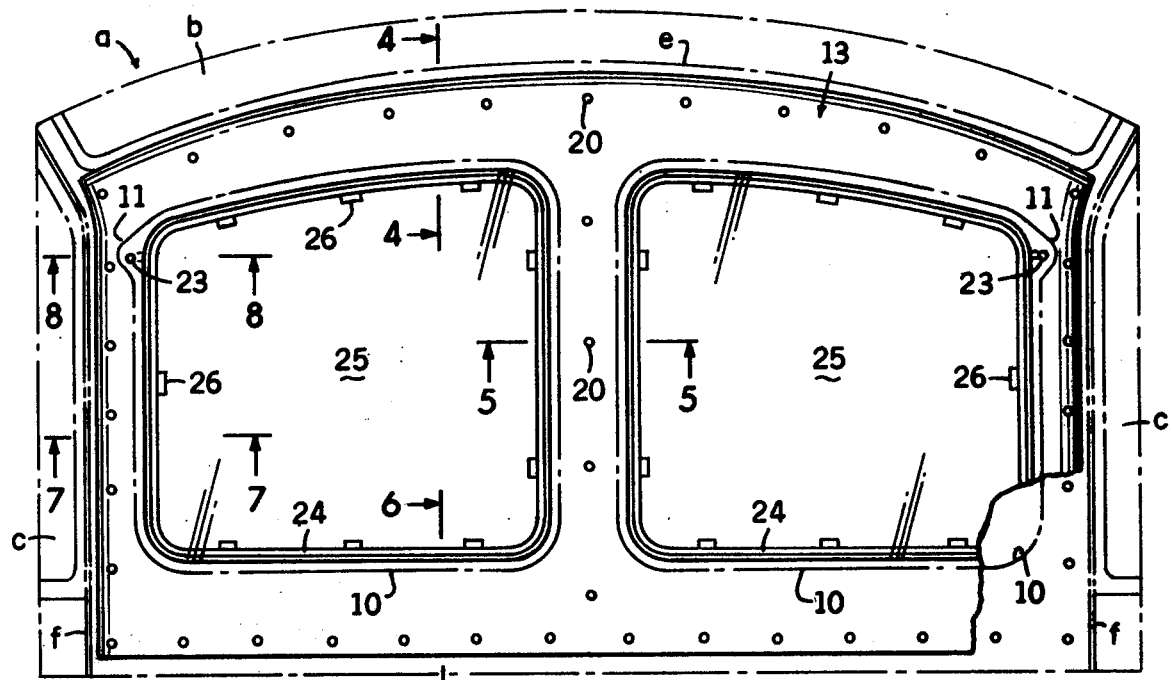
FIG. 1 shows a molded plastic fairing assembly embodying the present invention mounted in place on the forward portion of a van top shown in phantom lines.
Figure 2:
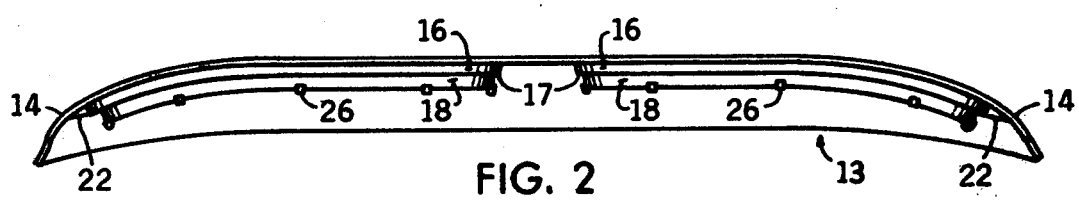
FIG. 2 is a rear view of the plastic fairing assembly prior to mounting.
Figure 3:
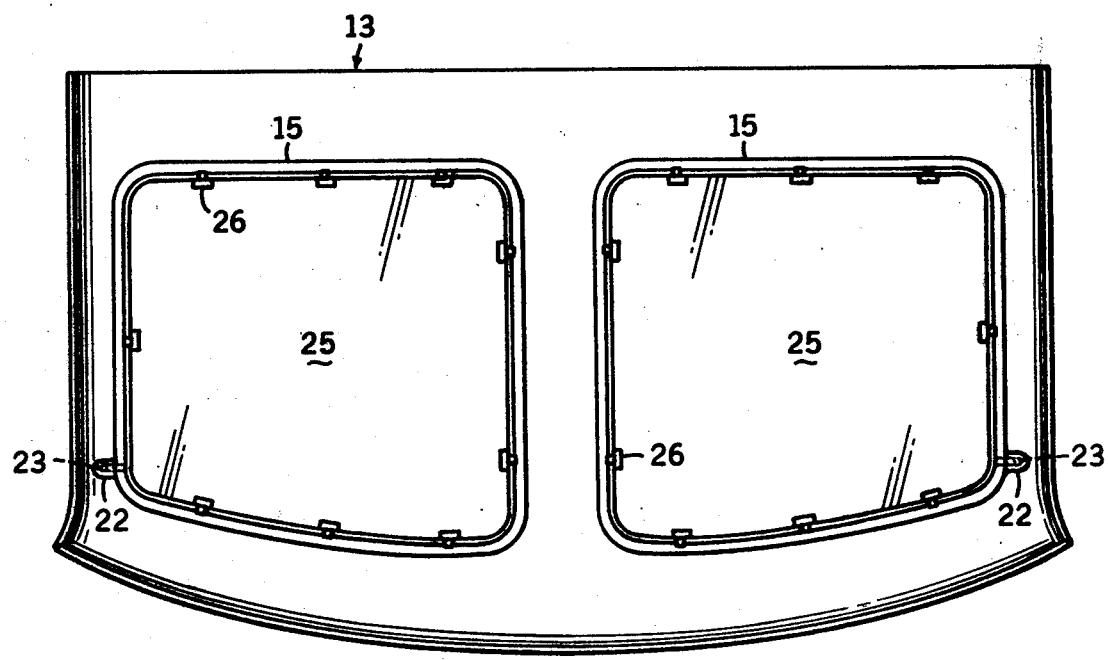
FIG. 3 is a bottom view thereof.
Figure 8:
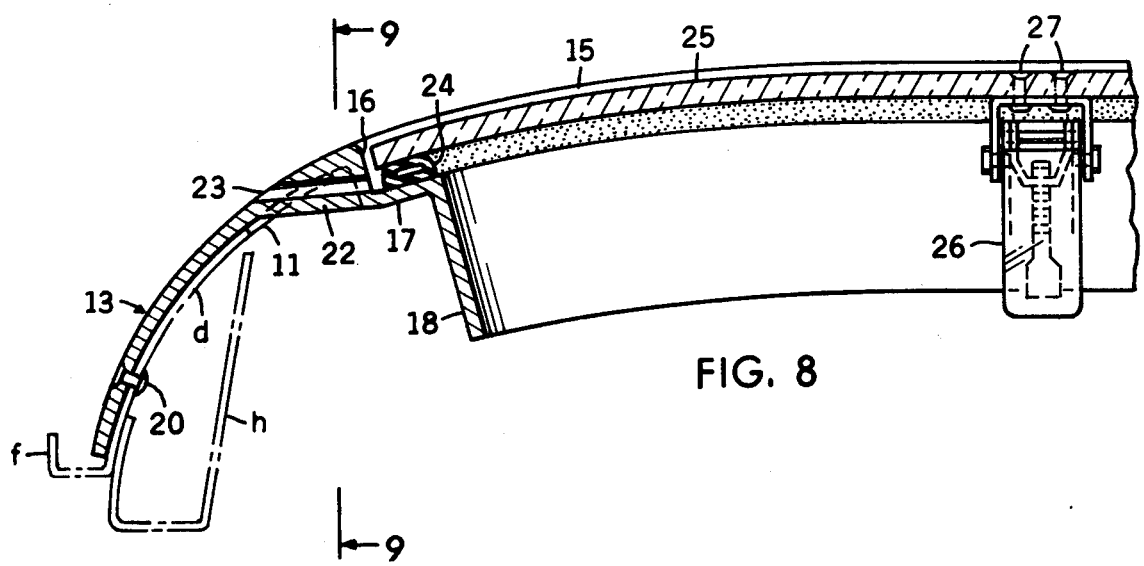
FIG. 8 is a similar cross-sectional view taken along line 8—8 of FIG. 1 and showing a drain passage of the fairing assembly.
Figure 9:
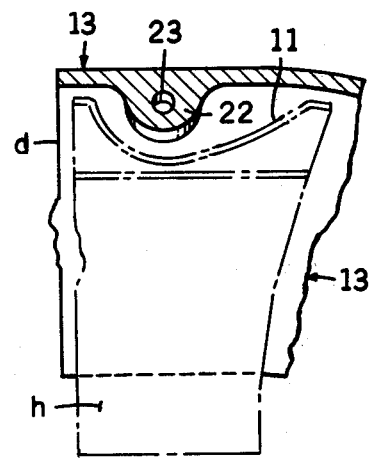
FIG. 9 is a fragmentary sectional view taken along line 9—9 of FIG. 8.

In applying the present invention, on the forward portion of the crowned roof d a pair of side-by-side cutouts 10 are made, one on each side of the longitudinal center of the roof b, as shown in phantom lines of FIG. 1. Each cutout 10, which is substantially four-sided as shown extends forward from near the transverse channel j to a point slightly aft of the windshield support member e and laterally from near the side reinforcements h in the crown of the roof d above the gutter f to a point short of the middle of the roof b. An outwardly extending notch 11 is cut from the forward outer corner of each cutout 10 as shown in FIGS. 1 and 9. The forward outer corner of the cutout 10 is its lowest point, due to the crowned nature of the van roof d. The cutouts 10 and notches 11 may be made by an electric metal-cutting sabre saw.

A molded laminated fiberglass fairing, generally designated 13, laid up to a substantially constant thickness, is of sufficient size to extend from gutter to gutter of the roof b and from the windshield support member e to aft of the transverse channel j. The fairing 13 is laid up against a mold surface which provides the smooth contour of its upper surface. The fairing 13 has crowned lateral edges 14 such that it may be superimposed over the lie adjacent to the forward portion of the crowned sheet metal roof d, and has a pair of side-by-side window openings 15, each having downward extending window rim portions 16. At the lower edge of each window rim portion 16 is an inward-extending portion, referred to as window support ledge 17. From the inner edges of these extend downward flanges 18.

The fairing 13 has locally deepened sections 22, which extending outward from the forward outer corner of each of the window openings 15 is accommodated within the outwardly extending notch 11 in the sheet metal roof d when the fairing 13 is secured onto the van roof d. Such deepened sections 22 are made by building up the laminated fiberglass to a greater thickness. The thickness of each deepened section 22 is such that it extends downwardly to the lower surface of the inward extending window support ledge 17. Each deepened section 22 contains a drain passage 23 which extends from the upper surface of the window support ledge 17 through the rim portion 16 and outward and downward until it reaches the outer surface of the plastic fairing 13. The drain passage 23 may be a bore hole, of sufficient diameter to allow the flow of water, made by drilling through the laminated plastic.

D-shaped gasket strips 24 are secured to the upper surfaces of the window support ledges 17 to form continuous gaskets spaced inwardly from the window rim portions 16. A transparent curved glass window pane 25 is provided for each of the window openings 15, each being of sufficient size to fit removably within the rim portions 16 and be supported on a window support ledge 17 by a gasket strip 24. Toggle latches 26, which are well known in the art and thus need not be particularly described are fastened as by rivets 27 to the undersurface of the window panes 25 near their edges; they grasp the lower edges of the downward flanges 18.

If water should fall on the outer surface of the curved window panes 25, water will flow to their edges, into the space inward of the window rim portions 16 and outward of the abutting gasket strip 24. Water so entering will flow to the lowest points on the window support ledges 17, which are at the forward outer corners of the openings 15, where the drain passages 23 are located. The water is then channeled outward through the drain passages 23 to the outer surface of the fairing 13, from whence it may flow down to the gutters f and away. Therefore, when it is desired to remove the window pane 25 by unlatching the toggle latches 26, any water which had fallen on the window pane 25 has already drained away.

As an alternative embodiment of the present invention, a single window opening may be substituted for the pair of side-by-side openings, so that a single window therein would extend substantially across the entire top, simulating a sun roof. Such window opening would have two drain passages, one at each of the lower outer forward corners, so that the water would be drained away at each of the low points.

Various alternatives will suggest themselves. For example, hinges could be utilized along one edge of each of the window panes 25 to permit opening them without requiring complete removal. As an alternative to attachment of the D-shaped gasket strips 24 to the window support ledges 17 of the fairing 13 itself, gasket might be attached to the lower surfaces of the window panes 25, positioned inwardly from the window rim portions 16. The drain passages may, if desired, consist of simple slots in the locally deepened sections, of sufficient depth to allow water to flow out from the window support ledges 17. If the present invention is applied to vehicles other than vans, for example, passenger automobiles, minor modifications will suggest themselves from this disclosure.

In installing the windowed laminated plastic fairing 13 on the crowned sheet metal roof d of the van a, the following steps are taken. The pair of side-by-side four-sided cutouts 10 are cut in the sheet metal van roof d. In each cutout 10, at its forward outer corner, the notch 11 leading outward and downward from the crowned roof portion of the van roof d is cut. The notch 11 is made of sufficient size to accept the locally deepened section 22 of the fairing 13 when the fairing 13 is in place on the van roof d. Next, the plastic fairing 13 is mounted in place using silicon cement and riveting along lines of rivets 20, installed through holes drilled at the time of installation through the fairing 13 and sheet metal roof d. It is molded of such size as to extend from one gutter to the other gutter of the van a and from rear of the windshield b to aft of the van doors c and crown-shaped to facilitate superimposition upon the crowned van roof d. In the molding process, the pair of downwardly rimmed window openings 15 are provided in the fairing 13, each being of such size that the downward rims fit within the roof cutouts 10 and each including a recessed window support ledge 17. The fairing 13 is molded with the locally deepened section 22 at its forward outer corner for acceptance by the notch 11 in the roof cutout 10 when the fairing 13 is secured to the roof d. The drain passage 23 is drilled through the locally deepened section 22 extending outward from the window support ledge 17 of the window opening 15. The continuous gasket strips 24 are cemented to the window support ledge 17 spaced inwardly from the downwardly rimmed window opening 15. If not previously attached, the window panes 25 are then removably fitted within the window opening 15, and so positioned as to be supported by the gasket 24 and latched to the flanges 18.

Conventional interior trim, now shown, is then applied, extending to the flanges 18, completing the installation.

By the present invention, the desired sporty appearance of a T-top passenger car is afforded to vans and similar vehicles.

I claim:

1. For installation over the forward portion of a vehicle having a crowned sheet metal vehicle, such roof having a pair of side-by-side cut-outs for receiving inward extending window rims, the forward outer corner of each cut-out having an outwardly extending notch,
   a molded plastic fairing having crowned lateral edges, further having
   a pair of window rim portions between said crowned edges and sized to fit within such cut-outs and formed downwardly to inward-extending window support ledges,
   the fairing having a locally deepened section in registration with each such outwardly extending notch of the metal roof and extending from below the window support ledge surface, outwardly through the adjacent crowned lateral edge and a drain passage formed through each said deepened section leading outward from the upper surface of said ledge, together with a pair of window panes fitting removably within said window rim portions and supported on said ledges by gasket strips, each strip being continuous about its ledge and spaced inward from said rim portion, whereby water entering between the edge of a window pane and the adjacent rim portion will be channeled by the gasket strip inwardly thereof to flow along said ledge to the forward outer corner thereof and to drain outward though the drain passage thereat.

2. The molded plastic fairing as defined in claim 1, wherein the drain passage comprises a bore hole, whereby to direct such draining water out from the rim portion without flowing over the crowned lateral edge of the fairing.

3. For installation over the forward portion of the crowned sheet metal roof of an automotive vehicle such roof having a cut-out for receiving an inward extending window rim, each of the forward outer corners of such cut-out having an outwardly extending notch, a molded plastic fairing having crowned lateral edges, and further having a window rim portion between said crowned edges and sized to fit within such cut-out and formed downwardly to an inward-extending window support ledge, the fairing having a locally deepened section in registration with such outwardly extending notch of the metal roof and extending from below the window support ledge surface, outwardly through the adjacent crowned lateral edge and a drain passage formed through each said deepened section leading outward from the upper surface of said ledge, together with a window pane fitting removably within said window rim portion and supported on said ledge by a gasket strip continuous about said ledge and spaced inward from said rim portion, whereby water entering between the edge of the window pane and the adjacent rim portion will be channeled by the gasket strip inwardly thereof to flow along said ledge to the forward outer corners thereof and to drain outward through the drain passages thereat.

4. A T-top assembly for vans and the like, comprising a molded laminated plastic fairing formed to a substantially constant thickness and having crowned lateral edges, further having a pair of side-by-side openings, each having a window rim portion formed downwardly to inward extending window support ledges, the fairing having a locally deepened section extending outward through its crowned lateral edge from the lowest point of the window support ledge thereadjacent, and a drain passage through such locally deepened section extending through said window rim portion outwardly and downwardly from said point on the window support ledge, together with a pair of window panes fitting movably within said window rim portion and supported on said ledges by gasket strips, each strip strip continuous about its ledge and spaced inward from said rim portion, and latching means for removably securing said window pane within said wndow rim portions.

5. The T-top assembly as defined in claim 4, wherein the window support ledges of said fairing have downward flanges along their inner edges, and the said latching means comprises toggle latches mounted on such window pane and removably grasping said downward flanges.

6. The process of installing a windowed fairing on the crowned sheet metal roof of an automotive vehicle, comprising the steps of cutting a cut-out in the vehicle roof spacedly aft of the windshield and inward of the sides of the vehicle, cutting in the forward and outward corner of such cut-out a notch leading outward and downward through the crowned roof portion thereat, mounting onto the vehicle roof a fairing having downwardly rimmed window opening of such size as to fit within the roof cut-out, said rimmed opened leading to a recessed window support ledge, the window opening having at its forward outer corner a deepened section positioned to fit within the notch of the roof cut-out, said deepened section extending downward beyond the level of said ledge and having a drain passage leading therethrough from said outward ledge, and removably fitting a window pane within the rim on a gasket supported on the ledge spacedly inward of the rim, whereby water entering between the window pane and the rim will flow between the gasket and rim to the forward outer corner of the ledge and thence outwardly through the drain passage.

* * * * *